United States Patent
Weiler, Jr. et al.

[11] Patent Number: 5,699,829
[45] Date of Patent: Dec. 23, 1997

[54] FLUID CONTROL VALVE WITH SOFT STARTUP

[75] Inventors: Charles A. Weiler, Jr., Holly; Hendrik Pieter Bareno, Sterling Heights, both of Mich.

[73] Assignee: Ross Operating Vale Co., Troy, Mich.

[21] Appl. No.: 645,679

[22] Filed: May 14, 1996

[51] Int. Cl.⁶ .................. F15B 13/04; F15B 20/00; F16K 35/06
[52] U.S. Cl. .................. 137/383; 91/29; 137/596; 137/625.68
[58] Field of Search .................. 91/31, 29; 137/383, 137/596, 625.68

[56] References Cited

U.S. PATENT DOCUMENTS

| Re. 30,403 | 9/1980 | Bitonti . | |
|---|---|---|---|
| 3,880,178 | 4/1975 | Panissidi . | |
| 4,075,928 | 2/1978 | Bitonti . | |
| 4,995,421 | 2/1991 | Bonacorsi et al. . | |
| 5,067,519 | 11/1991 | Russell et al. | 91/29 X |

*Primary Examiner*—Gerald A. Michalsky
*Attorney, Agent, or Firm*—Harness, Dickey & Pierce, P.L.C.

[57] ABSTRACT

A fluid control valve includes an adjustable soft start capability. The fluid control valve isolates an input port and connects an outlet port to an exhaust port when the fluid control valve is in its closed position. A system is provided for locking the fluid control valve in the closed position. When the fluid control valve is moved to an open position, the exhaust port is isolated and full communication between the input port and the outlet port is delayed by a piston which continues to block fluid flow between the input port and the outlet port. An adjustable by-pass passage bleeds pressurized fluid from the input port around the piston to the outlet port until a specified pressure is built up at the outlet port. When the pressure at the outlet port reaches the specified pressure, the piston is moved from a position which blocks the flow from the input port to the outlet port to a position which allows full communication between the input port and the outlet port.

14 Claims, 3 Drawing Sheets

5,699,829

FLUID CONTROL VALVE WITH SOFT STARTUP

FIELD OF THE INVENTION

The present invention relates to fluid control valves for use in pneumatic circuits. More particularly, the present invention relates to safety shut-off valves for use in pneumatic circuits which require a soft startup feature when the fluid pressure is first introduced into the pneumatic circuit.

BACKGROUND OF THE INVENTION

The manufacturing community utilizes air cylinders and other air actuated devices to control machinery, operate tools as well as performing various other manufacturing activities. These devices may be air actuated in a single direction with the return being by springs and/or gravity or these devices may be air actuated in both directions with the control of the device being accomplished with an air valve. At certain times, the need arises to disconnect the supply of compressed air to the device such as when service or maintenance is required. When disconnection of the supply of compressed air is required, normal precautions dictate that the disconnect valve must be locked to prevent reactivation while anyone is working on the device. In the case of air operated equipment, a lockout valve should be used to cut off the compressed air supply to the equipment and exhaust any stored or residual downstream air to provide protection for the individual performing this service or maintenance. Once the service and/or repairs have been made, and compressed air is again supplied to the device, the instantaneous supply of compressed air at full system pressure can result in the sudden and potentially dangerous shifting of the controlled device.

It is well known in the art to provide a piston, a spool or a poppet actuated fluid control valve between the compressed air supply system and the control valve for the particular device being powered by the compressed air. The piston of the fluid control valve is normally spring-urged in to its closed position with a restricted by-pass route being provided around the piston and to the outlet of the valve. With this arrangement, full system pressure will be prevented from flowing through the fluid control valve when the valve is initially opened. The restricted by-pass route around the piston will slowly build up air pressure on the delivery side of the fluid control valve thus slowly and safely moving the device being controlled by the valve. When the air pressure on the outlet side of the valve reaches a predetermined value, the fluid control valve will fully open and provide full supply pressure through the fluid control valve for normal operation.

In some versions of such a fluid control valve, the restricted by-pass is in the form of a small hole drilled through the valve. These fluid control valves cannot be adjusted to fine tune the timing for the supply of full system pressure and thus have a limited usefulness. Other versions of fluid control valves provided adjustability to the restricted by-pass. Some adjustable versions of the fluid control valves proved to be costly to manufacture and complicated to assemble and repair.

Accordingly, the continued development of fluid control valves having soft startup characteristics is directed towards fluid control valves which provide the desired adjustability in their operation and valves which can be produced at a lower cost while simultaneously providing simplicity of operation, maintenance and repair.

SUMMARY OF THE INVENTION

The present invention provides the art with a fluid control valve having the desired adjustable soft startup characteristics. The present invention utilizes a valve housing which is the same housing used with an on/off valve without soft startup characteristic. The valve spool of the on/off valve without the soft startup characteristics is replaced by a valve spool incorporating a moveable piston/seal assembly which becomes operational at the time of actuation of the valve. The movable piston/seal assembly results in a "reblocking" of the "in" to "out" flow path through the valve housing even though the valve handle has been pulled to the "on" position. A restricted by-pass route slowly increases the downstream pressure level until this downstream pressure moves the piston/seal assembly into a fully open position of the fluid control valve.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
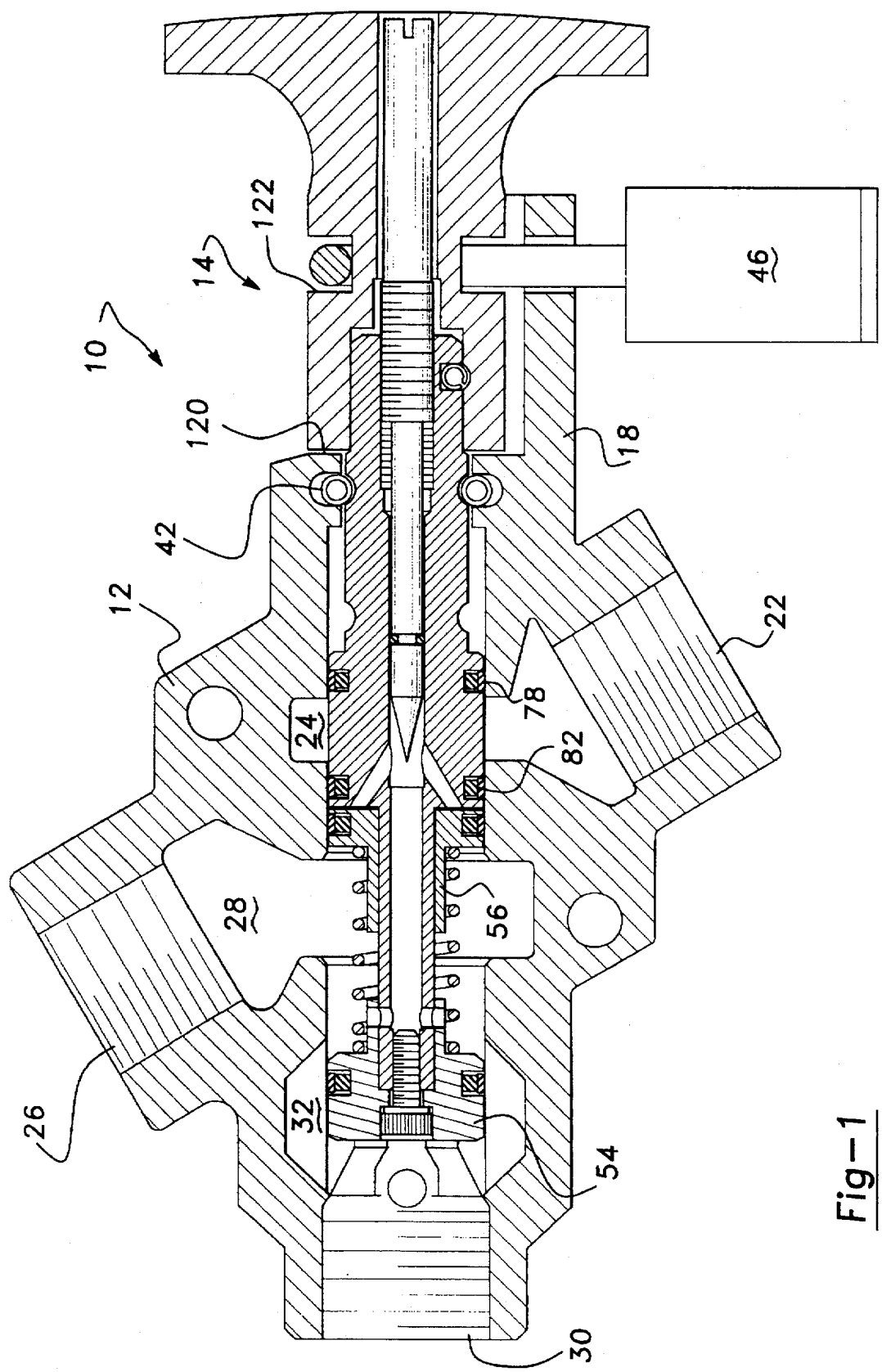
FIG. 1 is a side view, partially in cross section of a fluid control valve in accordance with the present invention shown in its closed position.

Referring now to the drawings in which like reference numerals designate like or corresponding parts throughout the several views, there is shown in FIG. 1 a fluid control valve incorporating a soft startup capability in accordance with the present invention which is designated generally as reference numeral 10. Fluid control valve 10 comprises a valve housing 12 and a valve spool assembly 14.

Figure 2:
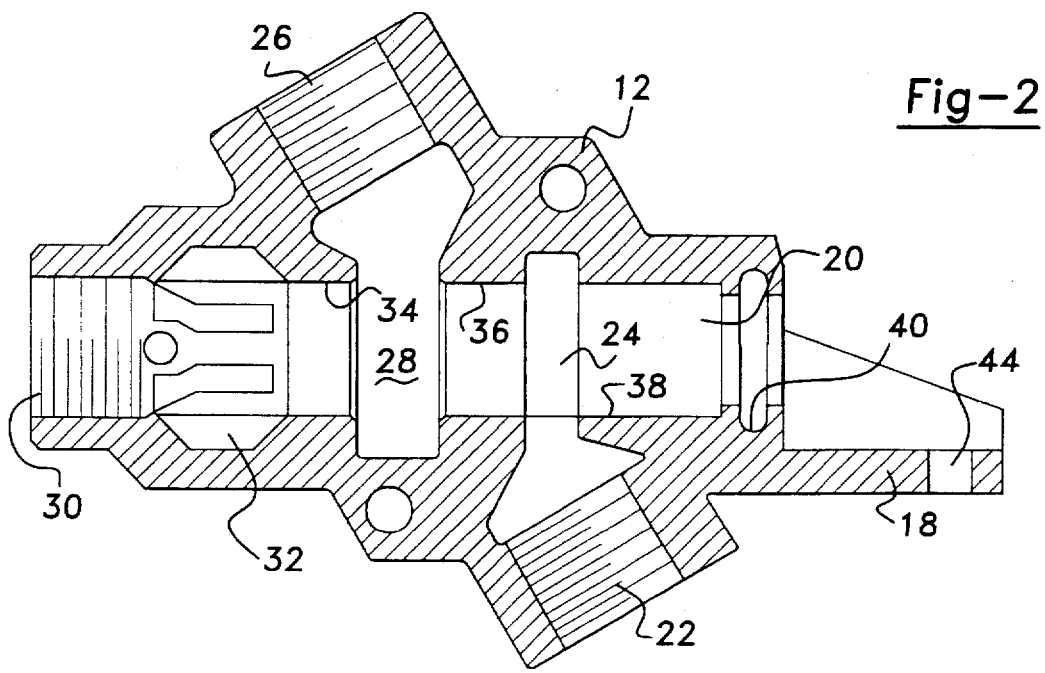
FIG. 2 is a cross sectional side view of a valve housing in accordance with the present invention.

Referring now to FIGS. 1 and 2, valve housing 12 defines a locking flange 18 and a longitudinally extending bore 20 which communicates with an inlet port 22 through an inlet chamber 24, an outlet port 26 through an outlet chamber 28 and an exhaust port 30 through an exhaust chamber 32. Inlet port 22 is adapted to be connected to a source of compressed air, outlet port 26 is adapted to be connected to a load line of an air operated device and exhaust port 30 is adapted to be connected to a muffler or similar device leading to the outside atmosphere. Bore 20 defines a first sealing surface 34 located between chambers 32 and 28, a second sealing surface 36 located between chambers 28 and 24 and a third sealing surface 38 located between chamber 24 and atmosphere. An annular groove 40 extends into housing 12 from bore 20 to provide a seat for a retaining spring 42 which cooperates with valve spool assembly 14 to releasably hold fluid control valve 10 into either a closed or an open position. Locking flange 18 defines an aperture 44 which accepts a padlock 46 or the like which cooperates with valve spool assembly 14 in order to lock fluid control valve 10 in its closed position. Sealing surfaces 34, 36 and 38 cooperate with valve spool assembly 14 to isolate fluid pressure within inlet port 22 and connect outlet port 26 with exhaust port 30 when fluid control valve 10 is in a closed position and to isolate exhaust port 30 and connect inlet port 22 with outlet port 26 when fluid control valve 10 is in an open position.

Figure 3:
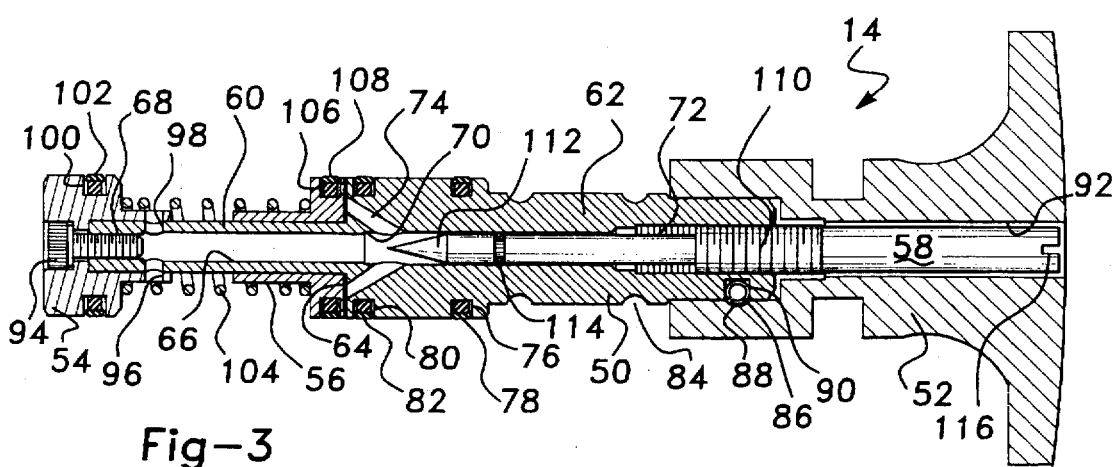
FIG. 3 is a side view, partially in cross section, of a valve spool in accordance with the present invention.

Referring to FIGS. 1 and 3, valve spool assembly 14 comprises a spool body 50, a handle 52, an exhaust spool segment 54, a piston 56 and an adjustment stem 58. Spool body 50 is a generally cylindrical member defining a stem portion 60 located at one end which meets a plug portion 62 to form a radial shoulder 64. Spool body 50 defines an axially extending bore 66 which extends through stem portion 60 and plug portion 62. Bore 66 includes a first threaded portion 68 located at the end of stem portion 60, a stepped portion 70 located in the middle of bore 66 near shoulder 64 and a second threaded portion 72 located at the end of plug portion 62. A pair of angular passages 74 extend from shoulder 64 into bore 66 as is shown in FIG. 3.

The exterior surface of plug portion 62 defines a first annular seal groove 76 within which is disposed a seal ring 78, a second annular seal groove 80 within which is disposed a seal ring 82 and a pair of annular grooves 84 which mate with spring 42 to releasably hold fluid control valve 10 into either its closed or open position. Handle 52 is secured to the end of plug portion 62 opposite to stem portion 60 and is retained by a roll pin 86 which is pressed through a hole 88 extending through handle 52 and a slot 90 formed in plug portion 62 of spool body 50. Handle 52 is attached to spool body 50 after spool body 50 is inserted into bore 20 of housing 12. A through bore 92 extends through handle 52 to provide access to adjustment stem 58.

Exhaust spool segment 54 is secured to the end of stem portion 60 opposite to plug portion 62 by a bolt 94 which is threadingly received within threaded portion 68 of bore 66. A hole 96 extends through spool segment 54 to mate with a hole 98 which extends through stem portion 60 to intersect with bore 66. The exterior surface of spool segment 54 defines an annular groove 100 within which is disposed a seal ring 102.

Piston 56 is slidingly received on stem portion 60 of spool body 50 between shoulder 64 and exhaust spool segment 54. A spring 104 is disposed between piston 56 and exhaust spool segment 54 to bias piston 56 towards shoulder 64. The external surface of piston 56 defines an annular groove 106 within which is disposed a seal ring 108.

Adjustment stem 56 extends through bore 92 in handle 52, through bore 66 in spool body 50 and includes a portion 110 which is threadingly received by threaded portion 72 of bore 66. The end of stem 58 located within bore 66 has a tapered head 112 which cooperates with stepped portion 70 of bore 66 to provide a variable orifice for the adjustable by-pass of fluid control valve 10. A seal 114 is disposed on stem 58 to prevent by-pass flow from leaking to atmosphere via clearances along the length of stem 58. The end of stem 58 opposite to tapered head 112 which is located within bore 92 defines a slot 116 which is utilized to rotate stem 58 to adjust the size of the orifice, the by-pass orifice or the by-pass flow area. Rotation of stem 58 thus adjusts the position of tapered head 112 with respect to stepped portion 70 of bore 66 which in turn adjusts the pressure build up rate at which the soft startup feature of the present invention operates.

The closed position of fluid control valve 10 is shown in FIG. 1. Valve spool assembly 14 is fully inserted into valve housing 12 with its travel being limited by handle 52 contacting a radial end 120 of housing 12. Inlet port 22 is isolated due to seal 82 contacting sealing surface 36 and seal 78 contacting sealing surface 38. Outlet port 26 is open to exhaust port 30 since seal ring 102 on exhaust spool segment 54 is in a non-sealing position, thus, allowing free flow from outlet port 26 to atmosphere at port 30. Piston 56 is disposed adjacent to shoulder 64 allowing the free flow of pressurized air from output port 26 to exhaust port 30. Fluid control valve 10 can be locked in this closed position by inserting padlock 46 into aperture 44 of locking flange 18 as shown in FIG. 1. The padlock extends into an annular groove 122 located in handle 52. Once padlock 46 has been assembled with fluid control valve 10, the opening of fluid control valve 10 is prohibited due to valve spool assembly 14 being unable to move relative to housing 12.

Figure 4:
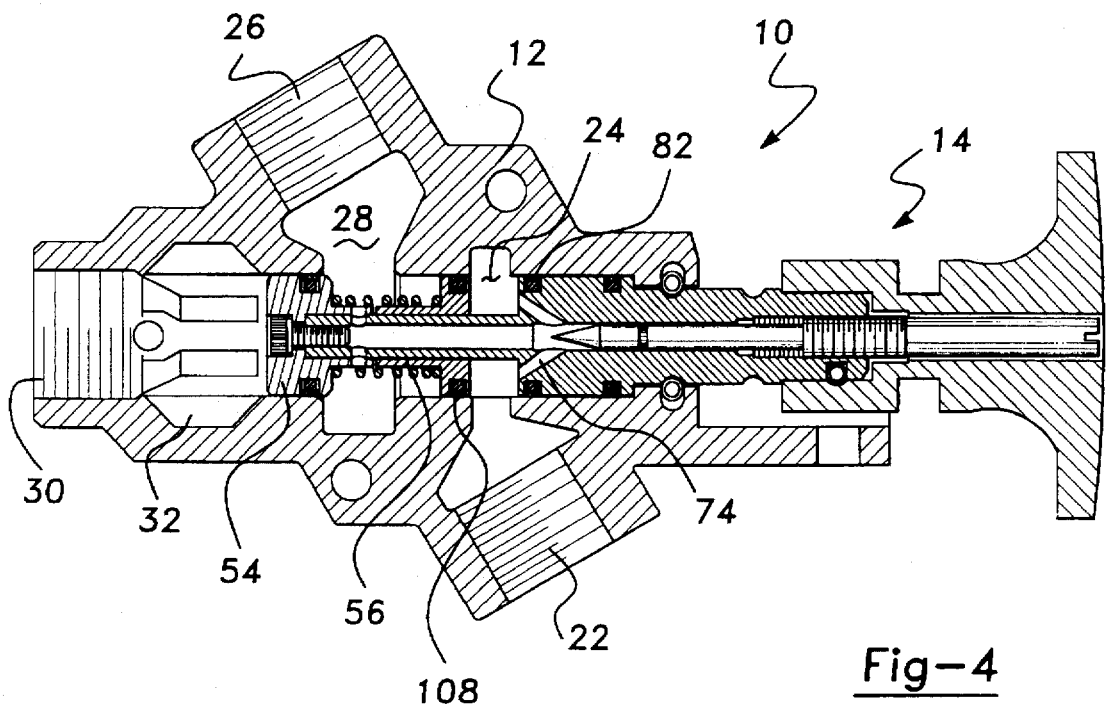
FIG. 4 is a view similar to that shown in FIG. 1 but with the valve being shown in its position immediately after being activated.

Referring now to FIGS. 3 and 4, the opening of fluid control valve 10 begins with the removal of padlock 46. With the removal of padlock 46, handle 52 can be pulled to move valve spool assembly 14 to its activated position as shown in FIG. 4. In this activated position, seal 82 is moved from one side of inlet chamber 24 where it contacts sealing surface 36 to the opposite side of inlet chamber 24 to contact sealing surface 38. This movement moves plug portion 62 of spool body 50 past inlet chamber 24 but piston 56 remains in position with seal 108 contacting sealing surface 36 to isolate inlet port 22 from both outlet port 26 and exhaust port 30. In addition, exhaust segment 54 is moved such that seal 102 contacts sealing surface 34 to isolate both inlet port 22 and outlet port 26 from exhaust port 30. The soft startup feature of the present invention is provided by passages 74. Inlet pressurized air from inlet port 22 is provided to inlet chamber 24. Pressurized fluid passes through passages 74 and into bore 66 through the opening defined by tapered portion 112 of stem 58 and stepped portion 70 of bore 66. Pressurized air flows down bore 66 and exits bore 66 through holes 96 and 98 to begin the slow pressurization of the fluid lines connected to outlet port 26. The rate of flow of pressurized air form inlet port 22 to outlet port 26 is controlled by the opening between tapered portion 112 and stepped portion 70 which is adjustable by the rotation of threaded stem 58 using a screwdriver and slot 116. The size of the opening controls the rate of pressurization of the load connected to outlet port 26.

Piston 56 is initially held in its lower position away from shoulder 64 due to the pressurized air which is provided to inlet chamber 24. The air pressure acts against the top surface of piston 56 to keep piston 56 in its lower position. This position of piston 56 is maintained by the pressure within inlet chamber 24 until the pressure builds up in outlet chamber 28 due to the by-pass system described above. When the pressure within outlet chamber 28 in combination with the load of spring 104 exceed the load exerted by the pressure within inlet chamber 24 piston 56 is moved from the position shown in FIG. 4 to the position shown in FIG. 5 which is the fully open position of fluid control valve 10.

Figure 5:
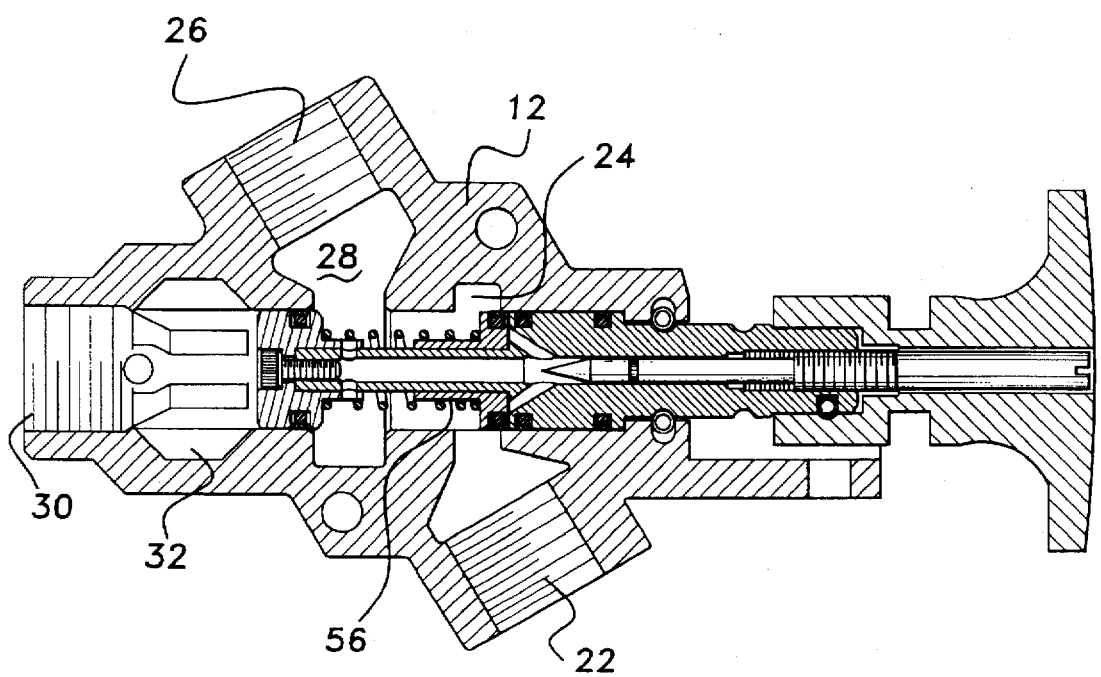
FIG. 5 is a view similar to that shown in FIGS. 1 and 4 but with the valve being shown in its fully open position.

In the fully open position as shown in FIG. 5, piston 56 has moved to its position immediately adjacent to shoulder 64. Inlet port 22 is fully open to outlet port 26. Seals 78 and 82 are in contact with sealing surface 38 and seal 102 is in contact with sealing surface 34.

When it is desired to close fluid control valve 10, valve spool assembly 14 is moved from the position shown in FIG. 5 to the position shown in FIG. 1 to instantly cut off the supply of pressurized air from inlet port 22 and release the pressurized air from outlet port 26 to exhaust port 30.

While the above detailed description describes the preferred embodiment of the present invention, it should be understood that the present invention is susceptible to modification, variation and alteration without deviating from the scope and fair meaning of the subjoined claims.

What is claimed is:

1. A fluid control valve comprising:

a valve housing defining an inlet port, an outlet port and an exhaust port;

a valve spool assembly movable with respect to said valve housing between an open condition and a closed condition, said inlet port being in communication with said outlet port when said valve spool assembly is in said open position, said outlet port being in communication with said exhaust port when said valve spool assembly is in said closed position; and means associated with said valve spool assembly for delaying full communication between said inlet port and said outlet port when said valve spool assembly is moved from said closed position to said open position, said delaying means comprising:

a piston slidably disposed upon said valve spool assembly, said piston blocking said full communication between said inlet port and said outlet port when said valve spool assembly is initially moved from said closed position to said open position; and a by-pass passage disposed between said inlet port and said outlet port, said by-pass passage being opened when said valve spool assembly is initially moved from said closed to said open position, said by-pass passage allowing fluid to flow from said inlet port to said outlet port at a specified rate, said piston being moved to allow said full communication between said inlet port and said outlet port when fluid pressure at said outlet port reaches a specified value.

2. The fluid control valve according to claim 1 wherein, said specified rate is adjustable.

3. The fluid control valve according to claim 1 further comprising retaining means for releasably securing said valve spool assembly in said open or said closed condition.

4. The fluid control valve according to claim 1 further comprising means for locking said valve spool in said closed position.

5. A fluid control valve comprising:

a valve housing defining an inlet port, and outlet port and an exhaust port;

a valve spool assembly movable with respect to said valve housing between an open condition and a closed condition;

a first passage extending between said outlet port and said exhaust port;

a second passage extending between said input port and said outlet port a third passage extending between said input port and said outlet port; and a piston slidably disposed upon said valve spool assembly, said piston closing said second passage and opening said third passage when said valve spool assembly is moved from said closed position to said open position, said piston opening said second passage a specified period of time after said valve spool assembly is moved to said open position.

6. The fluid control valve according to claim 5 wherein, said specified period of time is controlled by an orifice disposed within said third passage.

7. The fluid control valve according to claim 6 wherein, said orifice is adjustable.

8. The fluid control valve according to claim 5 wherein, said specified period of time is adjustable.

9. The fluid control valve according to claim 5 further comprising means for locking said valve spool in said closed position.

10. A fluid control valve comprising:

a valve housing defining an inlet port, an outlet port and an exhaust port;

a first passage extending through said housing connecting said outlet port to said exhaust port;

a second passage extending through said housing connecting said input port to said outlet port;

a valve spool assembly movable with respect to said valve housing between an open condition and a closed condition, said second passage being closed and said first passage being open when said valve spool assembly is in said closed condition, said first passage being closed when said valve spool assembly is in said open condition;

a piston slidably disposed on said valve spool assembly, said piston movable between an open position and a blocked position, said piston being disposed in said blocked position to close said first passage when said valve spool assembly is first moved to said open condition; and a third passage extending through said valve spool assembly connecting said input port to said outlet port, said third passage being open when said piston is in said blocked position to allow a specified flow of fluid between said input port and said outlet port such that fluid pressure increases in said outlet port at a rate slower than when said second passage is open, said piston moving from said blocked position to said open position to open said second passage when said fluid presure in said outlet port reaches a specified pressure.

11. The fluid control valve according to claim 10 wherein, said rate of increase of said fluid pressure in said outlet port is controlled by an orifice.

12. The fluid control valve according to claim 11 wherein, said orifice is adjustable.

13. The fluid control valve according to claim 10 wherein, said rate of increase of said fluid pressure in said outlet port is adjustable.

14. The fluid control valve according to claim 10 further comprising means for locking said valve spool in said closed position.

* * * * *

UNITED STATES PATENT AND TRADEMARK OFFICE
CERTIFICATE OF CORRECTION

PATENT NO. : 5,699,829
DATED : December 23, 1997
INVENTOR(S) : Weiler, Jr., et. al.

It is certified that error appears in the above-identified patent and that said Letters Patent is hereby corrected as shown below:

On the Title Page under Assignee, "Vale" should be --Valve--.

Column 3, line 45, "56" should be --58--.

Signed and Sealed this

Second Day of June, 1998

*Attest:*

BRUCE LEHMAN

*Attesting Officer*     *Commissioner of Patents and Trademarks*